United States Patent
Farmanbar

(10) Patent No.: US 9,807,023 B2
(45) Date of Patent: Oct. 31, 2017

(54) METHOD, APPARATUS AND MACHINE READABLE MEDIUM FOR TRAFFIC ENGINEERING IN A COMMUNICATIONS NETWORK HAVING QUALITY OF SERVICE FLOWS AND BEST EFFORT FLOWS

(71) Applicant: Hamidreza Farmanbar, Ottawa (CA)

(72) Inventor: Hamidreza Farmanbar, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

(21) Appl. No.: 14/608,814

(22) Filed: Jan. 29, 2015

(65) Prior Publication Data

US 2016/0226774 A1    Aug. 4, 2016

(51) Int. Cl.
*H04L 12/851* (2013.01)
*H04L 12/725* (2013.01)
*H04L 12/24* (2006.01)
*H04L 12/815* (2013.01)

(52) U.S. Cl.
CPC .............. *H04L 47/24* (2013.01); *H04L 41/08* (2013.01); *H04L 41/14* (2013.01); *H04L 41/5003* (2013.01); *H04L 45/302* (2013.01); *H04L 47/22* (2013.01)

(58) Field of Classification Search
CPC ............. H04L 41/5003; H04L 41/5022; H04L 47/2491; H04L 45/302; H04L 41/08; H04L 41/823; H04L 41/833; H04L 41/14; H04L 41/142
See application file for complete search history.

(56) References Cited

U.S. PATENT DOCUMENTS

| 6,721,270 B1 * | 4/2004 | Mitra ................... H04L 49/205 370/230 |
| 7,075,927 B2 | 7/2006 | Mo et al. |
| 2007/0091801 A1 | 4/2007 | Shahidi et al. |

(Continued)

FOREIGN PATENT DOCUMENTS

| CN | 101662800 A | 3/2010 |
| CN | 101849393 A | 9/2010 |

(Continued)

OTHER PUBLICATIONS

C. Wang, Bandwidth Allocation and QoS Routing for Heterogeneous Networks, Applied Mathematical Sciences, vol. 1, No. 43, pp. 2139-2151, 2007.*

(Continued)

*Primary Examiner* — Christopher Crutchfield

(57) ABSTRACT

The present disclosure provides a method, apparatus and machine readable medium for traffic engineering in a communications network having Quality of Service (QoS) flows and Best Effort (BE) flows. Traffic engineering in a mixed traffic scenario is a multi-objective optimization (MOO) problem having a solution which involves trade-offs between QoS performance objectives and BE performance objectives. In one embodiment of the method, jointly optimized paths and respective flow allocations for each of the QoS flows and BE flows are determined. At least one network component in the communications network are notified of the jointly optimized paths and respective flow allocations for each of the QoS flows and BE flows.

23 Claims, 6 Drawing Sheets

(56) References Cited

U.S. PATENT DOCUMENTS

| | | | |
|---|---|---|---|
| 2009/0116439 A1 | 5/2009 | Madan et al. | |
| 2013/0058214 A1* | 3/2013 | Foglar | H04L 41/5022 370/230.1 |

FOREIGN PATENT DOCUMENTS

| | | |
|---|---|---|
| CN | 103687023 A | 3/2014 |
| WO | WO 2010/112802 A1 | 10/2010 |

OTHER PUBLICATIONS

C. Wang, H. Luh, Network Dimensioning Problems of Applying Achievement Functions, Proceedings of The Sixth International Symposium on Operations Research and Its Applications, pp. 35-59, Aug. 12, 2006.*

W. Braun, M. Menth, Software-Defined Networking Using OpenFlow: Protocols, Applications and Architectural Design Choices, Future Internet, vol. 6, pp. 302-336, May 12, 2015.*

C. Duhamel, A. Mahul, An Augmented Lagrangean Approach for the QoS Constrained Routing Problem, pp. 1-15, 2007.*

G. Veciana, T. Lee T. Konstantopoulos, Stability and Performance Analysis of Networks Supporting Elastic services, IEEE Transaction on Networking vol. 9 No. 1, pp. 2-14, Feb. 2001.*

C. Wang, H. Luh, A Fair QoS Scheme for Bandwidth Allocation by Precomputation-Based Approach, Information and Management Sciences vol. 19, No. 3, pp. 391-412, 2008.*

PCT International Search Report and Written Opinion, PCT/IB2015/058791, dated Feb. 18, 2016, 11 pages.

Rojanarowan, J.; Koehler, B.G.; Owen, H.L., "MPLS Based Best Effort Traffic Engineering," IEEE SoutheastCon, p. 239-245, Mar. 2004.

Network Working Group, Internet Engineering Taskforce, "RFC 4126: Max Allocation with Reservation Bandwidth Constraints Model for Diffserv-aware MPLS Traffic Engineering & Performance Comparisons", Jun. 2005.

Mihaela Van Der Schaar and Sai Shankar, "Cross-Layer Wireless Multimedia Transmission: Challenges, Principles, and New Paradigms", IEEE Wireless Communications, p. 50-58, Aug. 2005.

Debasis Mitra, K.G. Ramakrishnan, and Qiong Wang, "Combined Economic Modeling and Traffic Engineering Joint Optimization of Pricing and Routing in Multi-Service Networks", Proceedings of 17th International Teletraffic Congress, Salvador, Brazil, 2001.

Julian, D.; Mung Chiang; O'Neill, D.; Boyd, S. "QoS and fairness constrained convex optimization of resource allocation for wireless cellular and ad hoc networks", INFOCOM 2002. Twenty-First Annual Joint Conference of the IEEE Computer and Communications Societies, IEEE Proceedings, vol. 2, pp. 477-486, Jun. 23-27, 2002.

* cited by examiner

METHOD, APPARATUS AND MACHINE READABLE MEDIUM FOR TRAFFIC ENGINEERING IN A COMMUNICATIONS NETWORK HAVING QUALITY OF SERVICE FLOWS AND BEST EFFORT FLOWS

TECHNICAL FIELD

The present disclosure relates to traffic engineering, and more particularly to a method, apparatus and machine readable medium for allocating traffic in a communications network having Quality of Service flows and Best Effort flows.

BACKGROUND

Communications networks have multiple traffic types. Some traffic types require Quality of Service (QoS) support, such as real-time/buffered video. Traffic types having QoS demands are known collectively as QoS traffic. Some other traffic types do not require any stringent QoS support, such as downloading, email, etc. Traffic types having no QoS demands are known collectively as Best Effort (BE) traffic.

The role of traffic engineering in a communications network is to direct traffic from sources to their corresponding destinations. This typically involves finding one or more paths from the flow source to the flow destination and splitting the flow among the one or more paths for all flows in the communications network. A flow can be identified by a source-destination pair. A flow often has a demand, i.e., rate requirement. A source-destination pair along with its flow demand is called a commodity. The links of the communications network have limited capacities.

Traffic engineering is intended primarily for QoS traffic to satisfy individual traffic requirements of QoS flows. Known traffic engineering techniques which handle mixed traffic scenarios in which both QoS and BE traffic are present typically consist of performing traffic engineering for all QoS flows using all available network resources, calculating the remaining network resources after routing and traffic splitting decisions have been made for all QoS flows, and performing traffic engineering for BE flows using the remaining network resources. Traffic engineering techniques which better handle mixed traffic scenarios are desired.

SUMMARY

Figure 1:
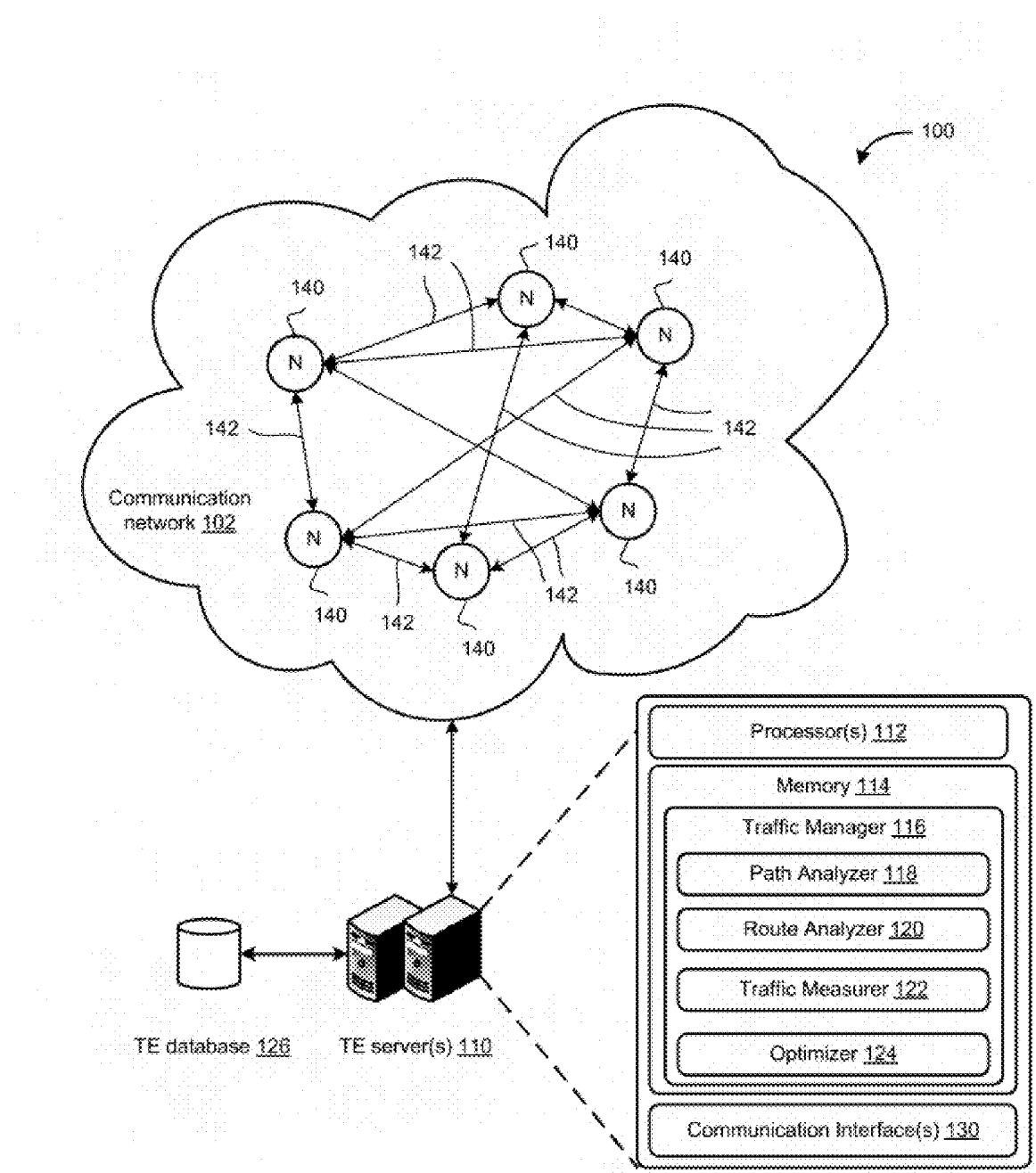
FIG. 1 illustrates an example communication system suitable for carrying out example embodiments of the present disclosure.

The present disclosure provides solutions for traffic engineering in mixed traffic scenarios in which a communications network has both QoS and BE traffic present. The communications network is a Multiprotocol Label Switching (MPLS) network in at least some embodiments. Traffic engineering is a multi-commodity flow (MCF) problem. The multi-commodity flow problem is a network flow problem in which the objective is to simultaneously satisfy the demands of multiple commodities while considering limited capacity of network links. The present disclosure provides traffic engineering solutions which handle QoS and BE traffic jointly, rather than handling BE traffic with remaining network resources after QoS traffic has been allocated, which can result in inefficient network resource allocation. Because all traffic types are considered jointly in accordance with the traffic engineering solution of the present disclosure, traffic splitting decisions for QoS flows can be affected by the presence of BE flows.

In accordance with a first aspect of the present disclosure, there is provided a method of traffic engineering in a communications network having Quality of Service (QoS) flows and Best Effort (BE) flows, the method comprising: determining jointly optimized paths and respective flow allocations for each of the QoS flows and BE flows; and notifying at least one network component in the communications network of the jointly optimized paths and respective flow allocations for each of the QoS flows and BE flows.

In accordance with a second aspect of the present disclosure, there is provided a method of traffic engineering in a communications network having Quality of Service (QoS) flows and Best Effort (BE) flows, the method comprising: determining jointly optimized flow allocations on links corresponding to each of the QoS flows and BE flows; and notifying at least one network component in the communications network of the determined flow allocations for each of the QoS flows and BE flows.

In accordance with a third aspect of the present disclosure, there is provided a method of traffic engineering in a communications network having Quality of Service (QoS) flows and Best Effort (BE) flows, the method comprising: determining jointly optimized paths and respective flow allocations for each of the QoS flows and BE flows in accordance with constraints of the communications network, a BE performance objective, a QoS performance objective, and a weighting allocated to each of the BE performance objective and QoS performance objective; and notifying at least one network component in the communications network of the determined paths and flow allocations for each of the QoS flows and BE flows.

In accordance with a fourth aspect of the present disclosure, there is provided a method of traffic engineering in a communications network having Quality of Service (QoS) flows and Best Effort (BE) flows, the method comprising: determining jointly optimized flow allocations on links corresponding to each of the QoS flows and BE flows in accordance with flow conservation constraints of the QoS flows and the BE flows, constraints of the communications network, a BE performance objective, a QoS performance objective, and a weighting allocated to each of the BE performance objective and QoS performance objective; and notifying at least one network component in the communications network of the determined flow allocations for each of the QoS flows and BE flows.

In some embodiments, the jointly optimized flow allocations on links are jointly optimized so that a total amount of traffic of any given flow going into a node equals an amount of traffic corresponding to that flow going out of the node except for the flow source and destination nodes. In some embodiments, the jointly optimized flow allocations on links are jointly optimized so that total traffic going through any backhaul link does not exceed a link capacity of the respective backhaul link. In some embodiments, the jointly optimized flow allocations on links are jointly optimized so that a sum of bandwidth used at any wireless access node does not exceed a total bandwidth of the respective wireless access node.

In accordance with further aspects of the present disclosure, there is provided a traffic engineering (TE) server for allocating traffic in a communications network having Quality of Service (QoS) flows and Best Effort (BE) flows, the TE server comprising: a communication interface for communicating with the communications network; a processor coupled to the communication interface and configured for performing the methods described above and herein.

In accordance with yet further aspects of the present disclosure, there is provided a non-transitory machine readable medium having tangibly stored thereon executable instructions that, when executed by a traffic engineering server, cause the traffic engineering server to perform the methods described above and herein.

Other aspects and features of the present disclosure will become apparent to those of ordinary skill in the art upon review of the following description of specific implementations of the disclosure in conjunction with the accompanying figures which show example embodiments of the present disclosure.

DETAILED DESCRIPTION OF EXAMPLE EMBODIMENTS

For simplicity and clarity of illustration, reference numerals may be repeated among the Figures to indicate corresponding or analogous elements. Numerous details are set forth to provide an understanding of the example embodiments described herein. The example embodiments may be practised without some of these details. In other instances, well-known methods, procedures, and components have not been described in detail to avoid obscuring the example embodiments described. The description is not to be considered as limited to the scope of the example embodiments described herein.

Referring first to FIG. 1, an example communication system 100 suitable for carrying out example embodiments of the present disclosure is shown. The communication system 100 includes a traffic engineering (TE) server (or controller) 110 connected to a communications network 102 such as the Internet. Multiple TE servers 110 may be provided in other embodiments. The communications network 102 includes a number of nodes 140, such as routers which enable path or route selection between endpoints of data communication in the communications network. The nodes 140 are interconnected by communication links 142, which may be wired or wireless. The communications network 102 is an Internet protocol (IP) network for transporting IP and Multiple Protocol Label Switch (MPLS) packets, i.e. an MPLS network. The communications network 102 may be any other packet-switched network operable to route, switch, and/or otherwise direct data packets based on network protocol addresses. The communications network 102 may comprise a number of interconnected networks.

User equipment (not shown) may connect to the communications network 102 via a wired link (e.g., local area network (LAN)) and/or wireless link (e.g., Wi-Fi). A suitable computing device 106 may be, but is not limited to, a server, a personal computer, a gaming console, a mobile phone, a smartphone or superphone, a music player, a tablet computer, a notebook computer (also known as a laptop, netbook or ultrabook computer depending on the device capabilities), a wireless organizer, a personal digital assistant, a mobile gaming device, a special purpose digital camera or wearable computer such as a smartwatch or optical head-mounted display, among other possible computing devices.

The TE server 110 may measure in real time, or near-real time, data communications across the communications network 102, determine available link capacities from measured traffic values, and determine the performance and cost of routing traffic in the communications network 102 from a particular source to a particular destination using any one of a number of alternative paths. The various link capacities are typically known by the TE server 110 as a fixed number. In the presence of background traffic (e.g., traffic that is not dealt with or accounted for by traffic engineering), the available link capacity is obtained by subtracting the link measured background traffic from the original link capacity.

The TE server 110 may also analyze the data communications across the communications network 102 to determine one or more optimal paths or routes for transmitting data between the particular source and the particular destination. The communications network 102 may also include label switch and subtending routers, Ethernet switches, Frame Relay switches and other suitable routers, switches, and nodes operable to generate and/or transport traffic. The TE server 110 may exchange data with various routers (core, edge, nexthub, etc.) that transmit data across various paths or routes to analyze candidate paths for data transmission. The TE server 110 may optionally modify routing tables for testing and measurement purposes and then output one or more optimum routing tables based on an analysis.

In FIG. 1, the communications network 102 is modelled as a directed graph G (N, A) comprising a plurality of nodes 140, such as but not limited to Internet protocol transport (IPT) nodes, interconnected by communication links (also known mathematically as arcs) 142, and in which N denotes the set of nodes 140 in the communications network 102 and A denotes the set of (wired or wireless) communication links 142 interconnecting the nodes 140 in the communications network 102. The communications network 102 may have a different number of nodes 140 and communication links 142 than that shown in FIG. 1 in other embodiments. Each node 140 comprises one or more processors (not shown) and a communication interface (not shown) having transmit and receive capabilities coupled to the processors.

The TE server 110 collects information about the plurality of nodes 140 and links 142 in the communications network and constructs a TE database 126. While the TE database 126 is shown as a separate entity in the shown embodiment, it may be part of the TE server 110 in other embodiments.

The TE server 110 includes one or more processors 112, memory 114 coupled to the processors 112, and a communications interface 130 coupled to the processors 112 for interacting with the communications network 102. The memory 114 may include Random Access Memory (RAM), Read Only Memory (ROM), and persistent (non-volatile) memory which may be flash erasable programmable read only memory (flash memory) or any other suitable form of memory.

The processors 112 operate under stored program control and execute software stored in memory 114, for example, in persistent memory. The software includes an operating system (not shown) and a traffic manager 116 which, when implemented by the processors 112, performs TE functions described herein. The software or parts thereof may be temporarily loaded into volatile memory such as RAM during execution. The RAM is used for storing runtime data variables and other types of data or information.

The traffic manager 116, in various embodiments, may include a path analyzer 118 to determine available paths between a source and a destination, a route analyzer 120 to determine routes between nodes in the communications network, a traffic measurer (or measurement module) 122, and an optimizer 124 (or optimization module). The traffic measurer 122 may be used to measure the performance of various paths between respective sources and destinations and determine available link capacities from measured traffic values. The measurement module 120 may identify possible paths and then measure traffic along these paths to determine the performance of data transmission using a particular path. Performance may be based on any selected parameter such as, for example, round trip time (RTT) (i.e., latency measurement). The measurement module 120 may output measured values to the optimization module 124 for further processing and/or store the measured values in memory 114

The optimizer 124 obtains QoS demands for QoS flows, QoS performance objectives for QoS flows, BE performance objectives for BE flows, measured values from the traffic measurer 122 and/or available link capacities from measured traffic values, and determines a traffic engineering solution jointly optimized for both QoS and BE flows as described more fully below. The QoS demands are associated with the QoS flows whereas QoS performance objectives for QoS flows and BE performance objectives for BE flows are network configuration parameters set, for example, by a network operator.

Path-Based Traffic Engineering

Figure 2:
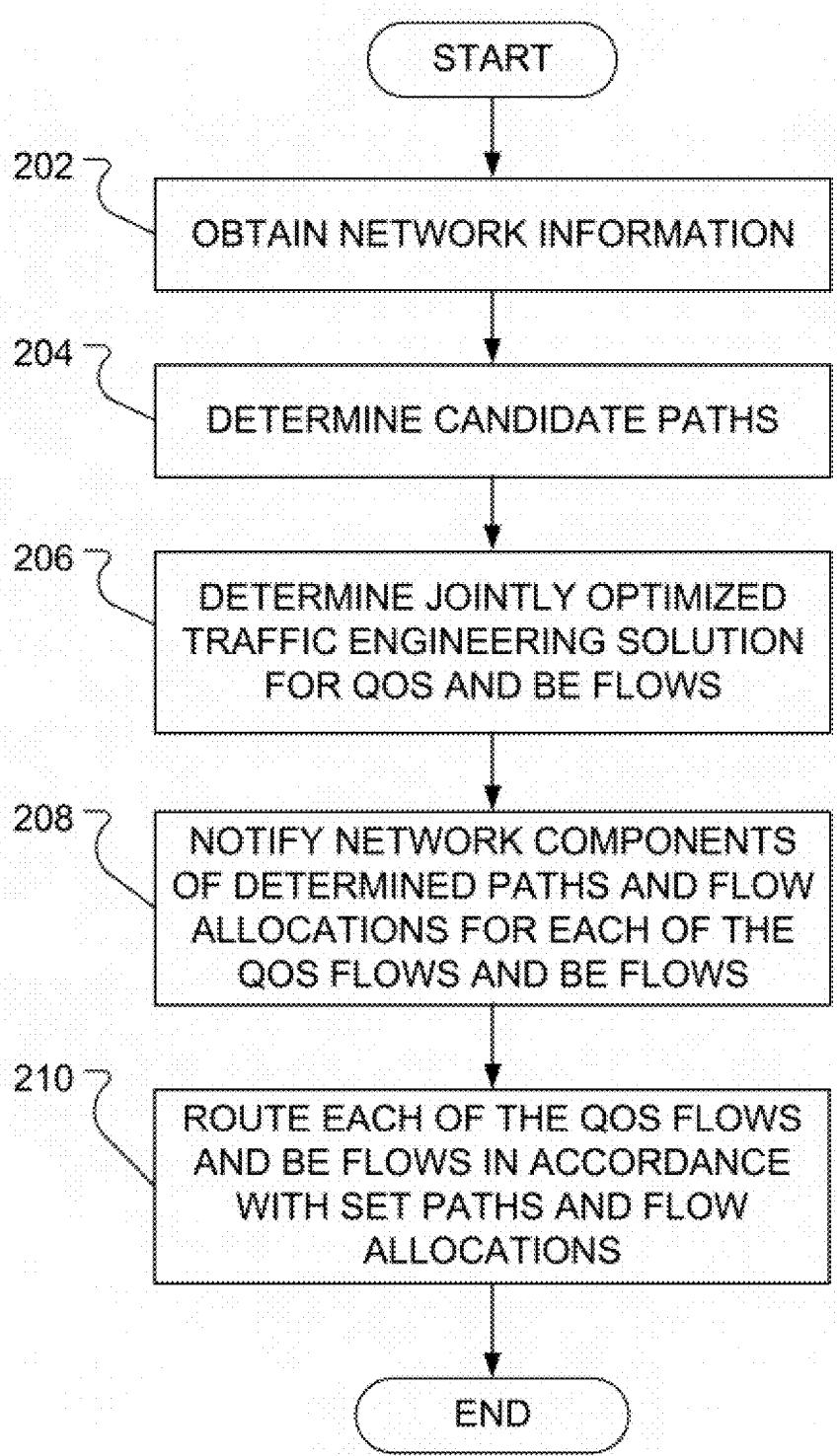
FIG. 2 is a flowchart of a method of path-based traffic engineering in a communications network having QoS flows and BE flows in accordance with one embodiment of the present disclosure.

Referring now to FIG. 2, a method of path-based traffic engineering in a communications network, such as the communications network 102, having QoS flows and BE flows in accordance with one embodiment of the present disclosure will be described. The method may be performed by the traffic manager 116 of the TE server 110 described above. The method is illustrated as a collection of logical blocks which represent operations which can be implemented in hardware, software, or a combination thereof. In the context of software, the blocks represent computer-executable instructions that, when executed by the processors 112 of the TE server, cause the processors 112 to perform the recited operations. The coding of software for carrying out such a method is within the scope of a person of ordinary skill in the art provided the present disclosure. The method may contain additional or fewer processes than shown and/or described, and may be performed in a different order.

In methods of path-based traffic engineering in accordance with the present disclosure, the communications network 102 is modelled as a directed graph G (N, A) comprising a plurality of nodes 140 interconnected by communication links 142, and in which N denotes the set of nodes 140 in the communications network 102 and A denotes the set of (wired or wireless) communication links 142 interconnecting the nodes 140 in the communications network 102. The method of FIG. 2 may be performed automatically in response to occurrence of a TE trigger event. A TE trigger is an event which causes a new jointly optimized traffic engineering solution to be determined. TE triggers may include the arrival of a new flow, the departure of an existing flow or both, or TE may be performed periodically (e.g., every millisecond), among other possibilities. For example, traffic engineering needs to be performed whenever a new flow arrives to determine paths and flow rates for the new flow.

At 202, network information such as link information, link capacity information, node information, and flow information regarding the QoS flows and BE flows is obtained by the traffic manager 116, for example, using the path analyzer 118, route analyzer 120, and/or traffic measurer 122. The link information may include the amount of traffic of each link, information about the traffic and connection/disconnection information of the respective link, as well as physical information such as link connection information. The flow information includes the number of QoS flows present in the communications network 102, denoted $K_1$, and the number of BE flows present in the communications network 102, denoted $K_2$.

At 204, the TE server 110, via the path analyzer 118, determines or otherwise identifies candidate paths that may be used to transmit data between a respective source and a respective destination for each of the QoS flows and BE flows in the communications network 102. The path analyzer 118 may use various routing tables to determine candidate paths and test the candidate paths to determine whether the candidate paths are viable paths for transmitting data. The determined candidate paths are typically a subset of all of the possible paths between the respective source and the respective destination, but could be all possible paths between the respective source and the respective destination. A subset of the possible candidate paths can be determined by filtering the possible paths between the respective source and the respective destination based on one or more selection criteria, such as link cost for the respective path, or link capacity for the respective path. For example, referring to FIG. 7 a wired communications network 702 having nodes A, B, C and D is shown in which the link capacity in bits per second (bps) for link A is 2 bps, for link A→C is 1 bps, for link B→D is 1 bps, and for link C→D is 1 bps. If we consider two paths A→B→D) and A→C→D in which the link cost is 1/c, the term c is the link capacity, the path A→B→D has a cost of 1½ (½+1/1) whereas the path A→C→D has a cost of 2 (1/1+1/1) so that the path A→B→D is the lower cost path. Techniques for path selection are well known in the art.

At 206, the optimizer 124 uses the candidate paths determined by the path analyzer 118, measured traffic values from the traffic measurer 122, and/or available link capacities derived from measured traffic values, constraints of the communications network 102 such as QoS demands of the $K_1$ QoS flows, one or more QoS performance objectives for the QoS flows, one or more BE performance objectives for the BE flows, and a weighting allocated to the QoS performance objectives and BE performance objectives denoted $w^{QoS}$ and $w^{BE}$, respectively, to analyze potential path and flow allocations (also known as flow rates) for each of the QoS flows and BE flows, and to determine a traffic engineering solution jointly optimized for both the QoS flows and the BE flows. It will be appreciated that both the QoS flows and BE flows are typically multipath in that a portion of each flow will be allocated to one of multiple paths through the communications network 102.

The weightings $w^{QoS}$ and $w^{BE}$ collectively represent a preference given to the QoS flows and the BE flows in achieving the respective performance objectives. Depending on available network resources and the weightings allocated to QoS performance objectives and BE performance objectives, the traffic engineering solution may result in QoS demands being unsatisfied. For example, if the weighting $w^{BE}$ allocated to the BE performance objectives is non-zero, QoS demands of at least some of the QoS flows may not be satisfied so that network resources are allocated more in favour of BE flows.

The QoS demands associated with the $K_1$ QoS flows are denoted $d_1, \ldots, d_{K_1}$. The QoS demands may be defined by one or more QoS demand parameters. The QoS demands/demand parameters may be stored in the memory 114 of the TE server 110 or the TE database 126, depending on the embodiment. The QoS demand parameters may relate to bandwidth, throughput, transmission delay (latency), out-of-order delivery, availability, error rates, jitter, and/or other quantitative measures of network service. The QoS demand parameters may vary between embodiments. The BE flows have no demands, in contrast to the QoS flows.

The QoS performance objectives and the BE performance objectives are performance objectives which are to be optimized rather than constraints which must be satisfied by the joint optimized traffic engineering solution. The QoS performance objectives for the QoS flows and the BE performance objectives for the BE flows are network configuration parameters set, for example, by a network operator to optimize the use of network resources. The QoS performance objectives and BE performances may be defined in terms of technical performance objectives (e.g., in terms of flow rates or other measure of network utilization) or non-technical performance objectives (e.g., in terms of income). In contrast to QoS performance objectives which are performance objectives to be optimized, QoS demands are associated with the $K_1$ QoS flows and are typically set by a network operator, for example, to meet agreed upon service expectations when sufficient network resources are available.

The QoS performance objective may be defined to provide overprovisioning (if the MCF problem is feasible) for the QoS flows or introduce a cost (if the MCF problem is not feasible) to account for flows that have received data rates less than their demands. Overprovisioning is an excess of capacity given to QoS flows so that network resources allocated to QoS flows in the joint traffic engineering solution are robust against flow demand fluctuations, changes in network link capacities, etc. The excess capacity provides a cushion to help ensure QoS demands are satisfied. However, this excess capacity can be reduced or eliminated so that the network resources are instead allocated to BE flows. Overprovisioning may also be provided depending on how the QoS demand constraint (path-based traffic engineering) or flow conservation demands (arc-based traffic engineering) are defined. If the MCF problem is not feasible, i.e., network resources are not sufficient to satisfy QoS demands, a cost term may be introduced in the QoS performance measure (i.e., QoS objective function) to represent the cost of not satisfying certain QoS flow demands. The cost term represents a penalty for not satisfying the QoS demands. The cost term is normally a function of difference between a QoS flow demand and the flow rate provided by the joint traffic engineering solution. Accordingly, a small difference between a QoS flow demand and the flow rate provided by the joint traffic engineering solution results in a smaller penalty than if the difference is large. The cost term is introduced in the QoS performance measure (i.e., QoS objective function) so that the difference between the QoS flow demands and the flow rates allocated to the QoS flows by the traffic engineering solution is minimized.

A BE performance objective is a performance objective of the BE flows which is to be optimized, such as weighted sum flow rate, max-min flow rate, load balancing (e.g., defined by a load balancing factor), etc. Load balancing seeks to optimize network resource use, maximize throughput, minimize response time, and avoid overload of any single resource. The load balancing factor is a network resource utilization factor which provides a measure of network resource use for the network operator, such as maximized throughput, minimized response time, etc.

With respect to 206, determining a jointly optimized traffic engineering solution comprises determining jointly optimized paths and respective flow allocations for each of the QoS flows and BE flows in accordance with QoS demands of the QoS flows, constraints of the communications network 102, one or more BE performance objectives, one or more QoS performance objectives, and a weighting allocated to each of the BE performance objective and QoS performance objective. It will be appreciated that determining jointly optimized paths involves considering each of the QoS flows and BE flows when determining the jointly optimized traffic engineering solution; however, it is possible that some BE flows and/or some QoS flows do not receive a flow allocation in the jointly optimized traffic engineering solution. That is, some flows could receive a flow allocation of zero.

In some embodiments, a QoS demand constraint based upon the QoS demands of the QoS flows is applied. The QoS demand constraint applies only to QoS flows. In at least some embodiments, the QoS demand constraints of the QoS flows are given by equation (1.1) defined as:

$$\sum_{j=1}^{l_k} x_j^k \leq d_k, k=1, \ldots, K_1. \quad (1.1)$$

Equation (1.1) represents a QoS demand constraint that the sum of the flow allocations over the various paths for the QoS flows does not exceed the QoS demands in the communications network 102, where $K_1$ denotes the number of QoS flows, $K_2$ denotes the number of BE flows, and K denotes the total number of flows present in the communications network 102 ($K=K_1+K_2$). The QoS demand constraint is based upon, but different than, the QoS demands of the QoS flows. In equation (1.1), the term $x_j^k$ denotes the flow allocation (in bps) of path j of flow k, $d_k$ denotes the demand of flow k, $k=1, \ldots, K_1$, and $l_k$ denotes the number of candidate paths for flow k, $k=1, \ldots, K_1+K_2$, $j=1, \ldots, l_k$. The inequality sign in equation (1.1) ensures that the joint traffic engineering problem is always feasible regardless of the QoS flow demands and the available network resources.

The constraints of the communications network 102 include backhaul link constraints which are applicable to all QoS flows and all BE flows insofar as backhaul links are utilized. This is a technical constraint of the communications network 102. The backhaul link constraints are given by equation (2) defined as:

$$\sum_{\text{path } p_j^k \text{ passing link } a} x_j^k \leq c_a, \forall \text{ wired link } a. \quad (2)$$

Equation (2) represents a backhaul link constraint that the total traffic going through any backhaul link does not exceed the link capacity. In equation (2), the term $p_j^k$ denotes the path j of flow k and $c_a$ is the capacity of the wired link a. It will be appreciated that a radio access network (RAN) has wireless and backhaul parts. The links of the backhaul part are modeled as fixed-capacity links (e.g., wired links) in accordance with equation (2) whereas wireless links are modeled differently as described by equation (3) described below.

The constraints of the communications network 102 also include wireless access node constraints which are applicable to all QoS flows and all BE flows in so far as wireless access nodes links are utilized. This is a technical constraint of the communications network 102. The wireless access node constraints are given by equation (3) defined as:

$$\sum_{\text{path } p_j^k \text{ passing node } n} \frac{x_j^k}{s_{a(k,j)}} \leq r_n, \forall \text{ wireless node } n. \quad (3)$$

Equation (3) represents a wireless access node constraint that the sum of the bandwidth used at any wireless access node does not exceed the total bandwidth of the node. In equation (3), the term a(k,j) is the last wireless (hop) link of path $p_j^k$, $s_{a(k,j)}$ is the spectral efficiency of the wireless (hop) link a(k,j) and $r_n$ is the total bandwidth available at wireless access node n.

In the described embodiment, the QoS demand constraint and the constraints of the communications network 102 are satisfied by the joint optimized traffic engineering solution. However, in other embodiments the QoS demand constraint is not necessarily satisfied by the joint optimized traffic engineering solution and instead the QoS demands of the QoS flows are treated as part of the QoS performance objectives rather a constraint to be satisfied by the joint optimized traffic engineering solution.

Because the QoS performance objectives and the BE performance objectives are conflicting objectives, a jointly optimized solution involves trade-offs between the QoS performance objectives and the BE performance objectives, thereby creating a multi-objective optimization (MOO) problem. The QoS performance objectives and BE performance objectives may be represented mathematically by objective functions. Thus, the MOO problem can be defined by the two objective functions defined by the QoS performance objectives of the QoS flows and the BE performance objectives of the BE flows. Using the well-known linear scalarization technique, the MOO problem can be used to obtain the following single-objective optimization problem:

$$\max_{x^1,\cdots,x^{K_1+K_2}} w^{QoS} U^{QoS}(x^1, \ldots, x^{K_1}) + w^{BE} U^{BE}(x^{K_1+1}, \ldots, x^{K_1+K_2}) \quad (4)$$

Equation (4) represents a solution to the joint optimization problem and is subject to equations (1.1), (2) and (3). It will be appreciated that the MOO problem can be formulated as a maximization problem or minimization problem, and that the MOO can be changed from a maximization problem to a minimization problem and vice versa with an appropriate change in sign. In equation (4), $U^{QoS}(x^1, \ldots, x^{K_1})$ is an objective function, which represents the QoS performance objectives to be optimized for the QoS flows, $U^{BE}$ $(x^{K_1+1}, \ldots, x^{K_1+K_2})$ an objective function, which represents the BE performance objectives to be optimized for the BE flows, $w^{QoS}$ is a weighting allocated to the QoS performance objectives of the QoS flows in the form of a scalarization parameter, and $w^{BE}$ is a weighting allocated to the BE performance objectives of the BE flows in the form of a scalarization parameter. As noted above, the QoS performance objectives may include an overprovisioning term for overprovisioning the QoS flows or a cost term to account for flows that have received data rates less than their demands. The cost term is normally a function of difference between a QoS flow demand and the flow rate provided by the joint traffic engineering solution and can be represented by the general term $\Sigma_{k=1}^{K_1} \Sigma_{j=1}^{l_k} (x_j^k - d_k)$.

The QoS performance objectives and BE performance objectives are determined by the network operator and may vary widely between different implementations. As noted above, the QoS performance objectives and BE performances may be defined in terms of technical performance objectives or non-technical performance objectives. It will be appreciated that the scalarization parameters in equation (4), though representing weightings allocated to the QoS or BE performance objectives, are not necessarily fractional or percentage values, depending on the formulation of the particular single-objective optimization problem given the QoS and BE performance objectives. The weightings $w^{QoS}$ and $w^{BE}$ define the trade-offs between the QoS and BE performance objectives. The larger the weighting, the higher importance the corresponding performance objective has in the single-objective optimization problem of equation (4). The weightings are set by, for example, a network operator based on a selected trade-offs between QoS and BE performance objectives and are provided as input to the TE server 110. The TE server 110 jointly performs traffic engineering for all flows by solving the optimization problem of equation (4) to provide a traffic engineering solution that may more closely approximate a Pareto optimal traffic engineering solution for both the QoS flows and the BE flows. It will be appreciated that a solution is Pareto optimal when none of the objective functions can be improved in value without impairment of at least some of the other objective functions.

In other embodiments, the QoS demand constraints of the QoS flows are given by equation (1.2) defined as:

$$\Sigma_{j=1}^{l_k} x_j^k = \lambda d_k, k=1, \ldots, K_1. \quad (1.2)$$

Equation (1.2) represents a QoS demand constraint that the sum of the flow allocations over various paths for the QoS flows equals $\lambda d_k$ in the communications network 102, where $K_1$ denotes the number of QoS flows, $K_2$ denotes the number of BE flows, and K denotes the total number of flows present in the communications network 102 ($K=K_1+K_2$). In equation (1.2), the term $\lambda$ is an auxiliary variable for the weighted max-min problem formulation, $x_j^k$ denotes the flow allocation (in bps) of path j of flow k, $d_k$ denotes the demands of flow k, k=1, . . . , $K_1$, and $l_k$ denotes the number of candidate paths for flow k, k=1, . . . , $K_1+K_2$, j=1, . . . , $l_k$. A value of $\lambda>1$ represents an overprovisioning condition with respect to the QoS flows. A value of $\lambda>1$ means that the sum of the flow allocations over the various paths for the QoS flows exceeds the QoS demands. A value of $\lambda<1$ typically represents an underprovisioning condition with respect to the QoS flows in which none of the QoS flow demands are satisfied. It is also contemplated that some QoS flows are overprovisioned whereas other QoS flows are not, or that the amount of overprovisioning may vary (i.e. having more or less overprovisioning) between different QoS flows which are overprovisioned. In this way, differential overprovisioning may be provided. One approach to implementing such differential overprovisioning is to use artificially larger demand $d_k$ for flows which are overprovisioned compared with QoS flows which are not overprovisioned or which are overprovisioned to a less degree, and use the same $\lambda$, which would result in the particular flow(s) having a higher larger demand $d_k$ being overprovisioned relative to its actual demand.

This provides the following objective functions for $U^{QoS}$ ($x^1, \ldots, x^{K_1}$) and $U^{BE}$ ($x^{K_1+1}, \ldots, x^{K_1+K_2}$) are given by equations (5.1) and (5.2) defined as follows:

$$U^{QoS}(x^1, \ldots, x^{K_1}) = \lambda, \quad (5.1)$$

$$U^{BE}(x^{K_1+1}, \ldots, x^{K_1+K_2}) = \Sigma_{k=K_1+1}^{K_1+K_2} \Sigma_{j=1}^{l_k} x_j^k \quad (5.2)$$

The objective functions for $U^{QoS}$ ($x^1, \ldots, x^{K_1}$) and $U^{BE}$ ($x^{K_1+1}, \ldots, x^{K_1+K_2}$) in equations (5.1) and (5.2) provide a corresponding single-objective optimization problem for joint traffic engineering given by equation (6) defined as follows:

$$\max_{x^1, \ldots, x^{K_1+K_2}} w^{QoS}\lambda + w^{BE}\Sigma_{k=K_1+1}^{K_2}\Sigma_{j=1}^{l_k} x_j^k \quad (6)$$

Equation (6) represents an alternate solution to the joint optimization problem subject to equations (1.2), (2) and (3).

At 208, the traffic manager 116 notifies one or more relevant network components, such as routers, in the communications network 102 of the jointly optimized paths (e.g., label switched paths (LSPs)) and respective flow allocations for each of the QoS flows and BE flows. The notifying of the one or more relevant network components may be performed by the TE server 110 or other network component, such as intermediate node. The settings of the relevant routers are then set or modified in accordance with the jointly optimized paths and respective flow allocations after receiving the notification so that routing of data communications will occur in accordance with the jointly optimized paths and respective flow allocations. The jointly optimized paths and respective flow allocations of the QoS flows and BE flows which are relevant to a particular router may be stored in the memory of the particular router. In some embodiments, the one or more relevant network components may self-set or self-update by setting or modifying routing settings in response to receiving the jointly optimized paths and respective flow allocations. In other embodiments, the TE server 110 or other network component may send instructions to at least one network component in the communications network 102, the instructions including the jointly optimized paths and respective flow allocations for each of the QoS flows and BE flows and instructions which cause the at least one network component to set or modify routing settings in accordance with the jointly optimized paths and respective flow allocations. The routing tables used by the various routers in the communications network 102 may be set or modified by the TE server 110 or other network component, depending on the embodiment. In at least some examples, the jointly optimized traffic engineering solution uses multiple paths for some flows (e.g., QoS flows and/or BE flows).

At 210, each of the QoS flows and BE flows are routed through the communications network in accordance with the jointly optimized paths and flow allocations from 208.

Figure 7:
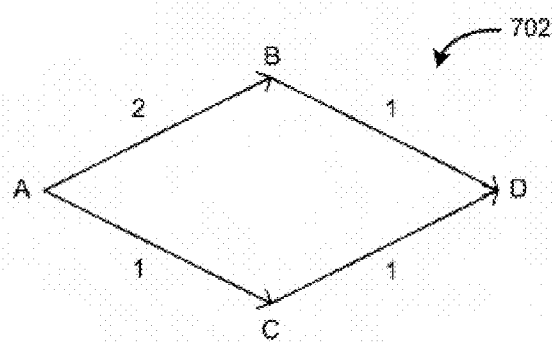
FIG. 7 is a schematic diagram illustrating an example wired network having nodes A, B, C and D.

Selected advantages of the jointly optimized traffic engineering solution of the present disclosure will now be described with reference to FIGS. 7, 8A and 8B. FIG. 7 is a schematic diagram illustrating an example wired communications network having nodes A, B, C and D in which the link capacity in bits per second (bps) for link A→B is 2 bps, for link A→C is 1 bps, for link B→D is 1 bps, and for link C→D is 1 bps. Consider a first example in which the wired communications network in FIG. 7 has two flows (not shown) denoted Flow 1 (A, D) and Flow 2 (A, B), Flow 1 (A, D) is a QoS flow with a demand of 1 bps, Flow 2 (A, B) is a BE flow with no demands, and the traffic engineering objective is to satisfy the demand of the QoS flow and to maximize the rate of the BE flow.

The conventional traffic engineering approach is to perform traffic engineering for all QoS flows using all available network resources, calculate the remaining network resources after routing and traffic splitting decisions have been made for all QoS flows, and perform traffic engineering for BE flows using the remaining network resources. In accordance with the conventional traffic engineering approach, in the first step, the path A→B→D would be selected according to shortest path policy with link cost 1/c, where c is the link capacity. After resource allocation for Flow 1, in the second step the remaining capacity on links A→B and B→D would be determined to be 1 and 0, respectively. In the third step, the TE server 110 would allocate at most 1 bps for Flow 2. In contrast, in accordance with the jointly optimized traffic engineering approach, if both flows are considered jointly, the path A→C→D can be selected for Flow 1 to leave additional capacity for Flow 2. In the jointly optimized traffic engineering approach, the demand of Flow 1 is still satisfied while Flow 2 can be allocated 2 bps.

Consider a second example in which the wired communications network in FIG. 7 has a different Flow 2. In the second example, Flow 2 (B, D) flows between nodes B and D rather than nodes A and B in the first example. As in the first example, Flow 2 is a BE flow with no demands and the traffic engineering objective is to satisfy the demand of the QoS flow and to maximize the rate of the BE flow. In accordance with the conventional traffic engineering approach, the path A→B→D would be selected according to shortest path policy and the remaining capacity on links A→B and B→D would be determined to be 1 and 0, respectively, as in the first example. However, in the third step, the TE server 110 would allocate no flow to the Flow 2 since there is no remaining capacity on link B→D. In contrast, in accordance with the jointly optimized traffic engineering approach, if both flows are considered jointly, the path A→C→D can be selected for Flow 1 to leave capacity for Flow 2 on link B→D. In the jointly optimized traffic engineering approach, the demand of Flow 1 is still satisfied while Flow 2 can be allocated 1 bps whereas under the conventional approach Flow 2 would have had no flow.

Figure 8A:
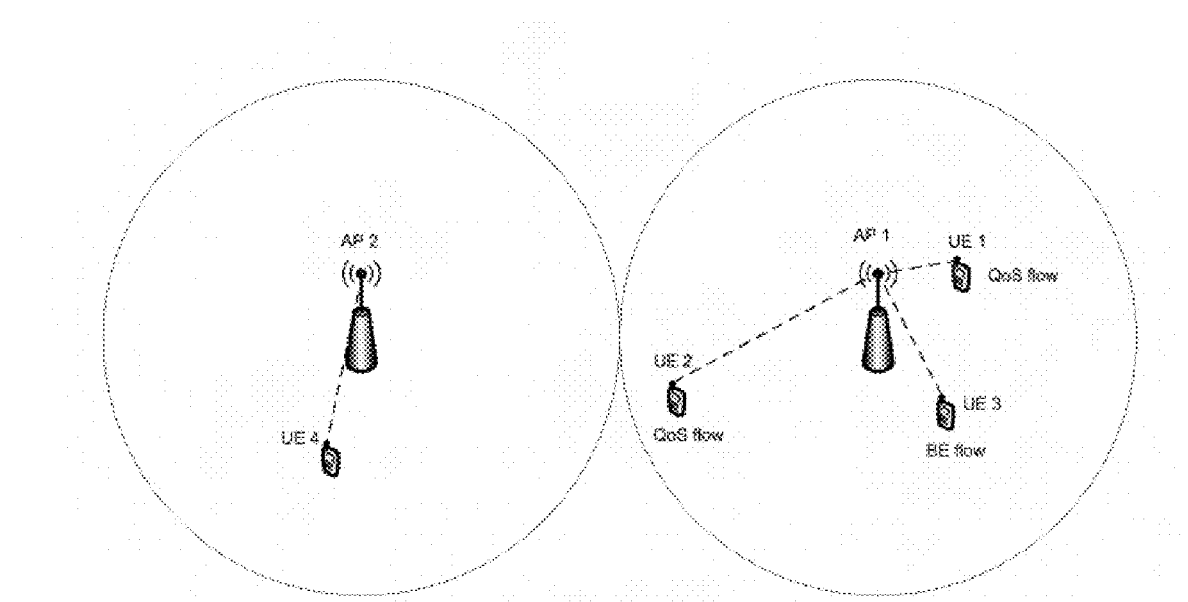
FIG. 8A is a schematic diagram illustrating an example wireless network in which mixed traffic flows have been allocated in accordance with a conventional traffic engineering approach.
Figure 8B:
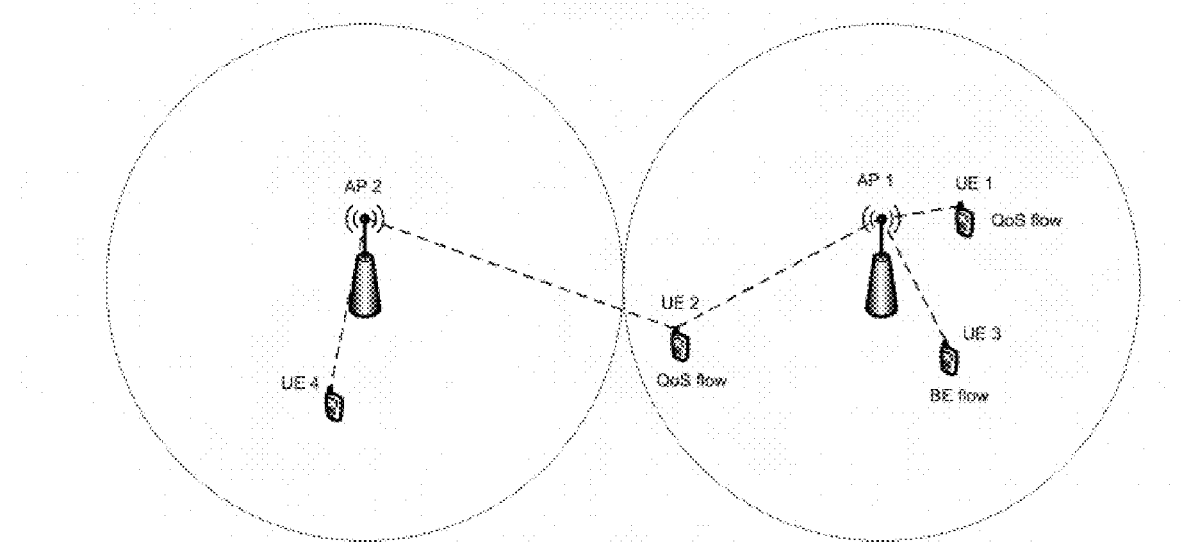
FIG. 8B is a schematic diagram illustrating the example wireless network of FIG. 8A but in which mixed traffic flows have been allocated in accordance with a joint traffic engineering approach in accordance with the present disclosure.

FIGS. 8A and 8B show a schematic diagram illustrating an example wireless network. The wireless links from Access Points (APs) to User Equipment (UEs) are shown by dashed lines. As in the example of FIG. 7, the traffic engineering objective is to satisfy the demand of the QoS flow and to maximize the flow rate of the BE flow. In accordance with the conventional traffic engineering approach, assuming the bandwidth at AP 1 is sufficient for satisfying the demands of UE 1 and UE 2 (with QoS flows), UE 1 and UE 2 would be allocated to AP 1. The remaining bandwidth at AP 1 would then be used to provide the rate for UE 3 (with BE flow). This is illustrated in FIG. 8A. In contrast, in accordance with the jointly optimized traffic engineering approach, all flow types would be considered jointly and UE 2 can be allocated to both AP 1 and AP 2 such that it can receive its demand partly from AP2 (assuming AP 2 has extra bandwidth after satisfying the demand of UE 4).

This will leave more bandwidth for UE 3 (BE flow) which results in higher rate for UE 3. This is illustrated in FIG. 8B.

EXAMPLE

The performance of path-based traffic engineering in accordance with the present disclosure will now be described in terms of a mean session Quality of Experience (QoE) of a simulated traffic engineering scenario. As an example, in the simulated traffic engineering scenario, the QoS performance objective for the QoS flows is weighted max-min, denoted $\lambda$, and the BE performance objective for the BE flows is the sum rate objective. As noted above, this provides the following objective functions for $U^{QoS}$ ($x^1, \ldots, x^{K_1}$) and $U^{BE}$ ($x^{K_1+1}, \ldots, x^{K_1+K_2}$):

$$U^{QoS}(x^1,\ldots,x^{K_1})=\lambda, \tag{5.1}$$

$$U^{BE}(x^{K_1+1},\ldots,x^{K_1+K_2})=\sum_{k=K_1+1}^{K_1+K_2}\sum_{j=1}^{l_k}x_j^k \tag{5.2}$$

The objective functions for $U^{QoS}$ ($x^1, \ldots, x^{K_1}$) and $U^{BE}$ ($x^{K_1+1}, \ldots, x^{K_1+K_2}$) in equations (5.1) and (5.2) provide a corresponding single-objective optimization problem for joint traffic engineering given by $$\max_{x^1,\ldots,x^{K_1+K_2}} w^{QoS}\lambda+w^{BE}\sum_{k=K_1+1}^{K_1+K_2}\sum_{j=1}^{l_k}x_j^k \tag{6}$$

subject to equations (1.2), (2) and (3).

Figure 4:
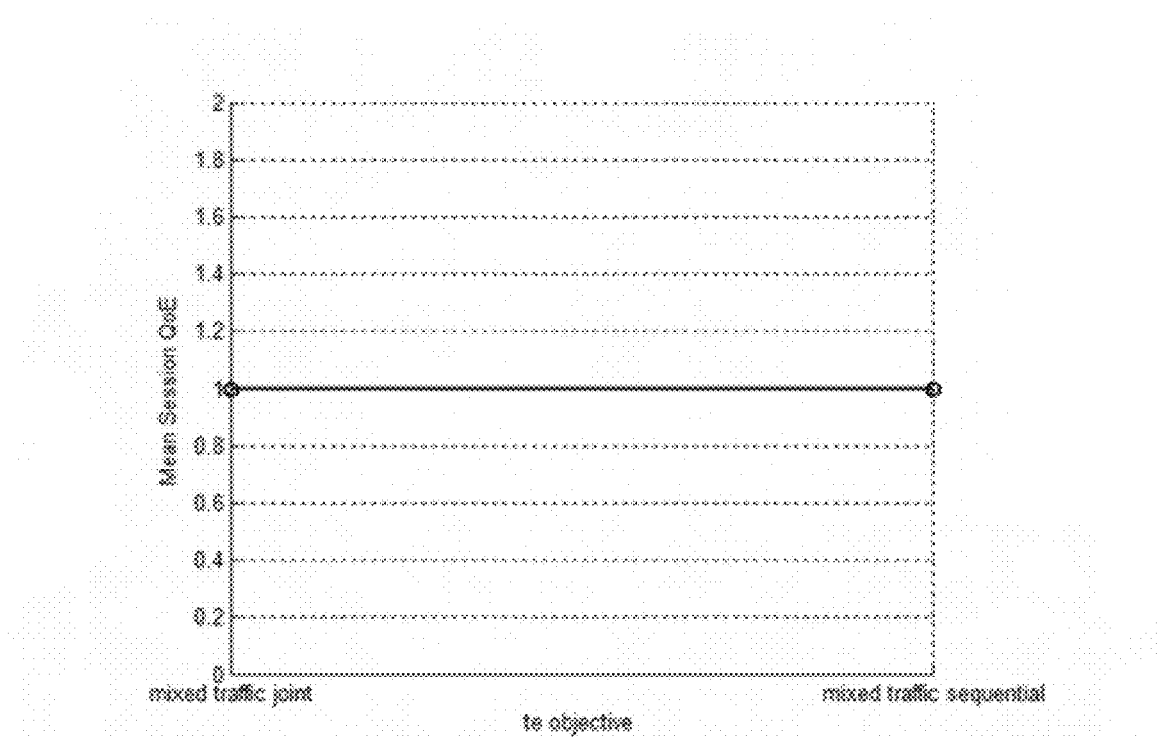
FIG. 4 is a graph illustrating the performance of QoS flows in terms of a mean session Quality of Experience (QoE) of a simulated traffic engineering scenario having undergone path-based traffic engineering in accordance with the present disclosure.
Figure 5:
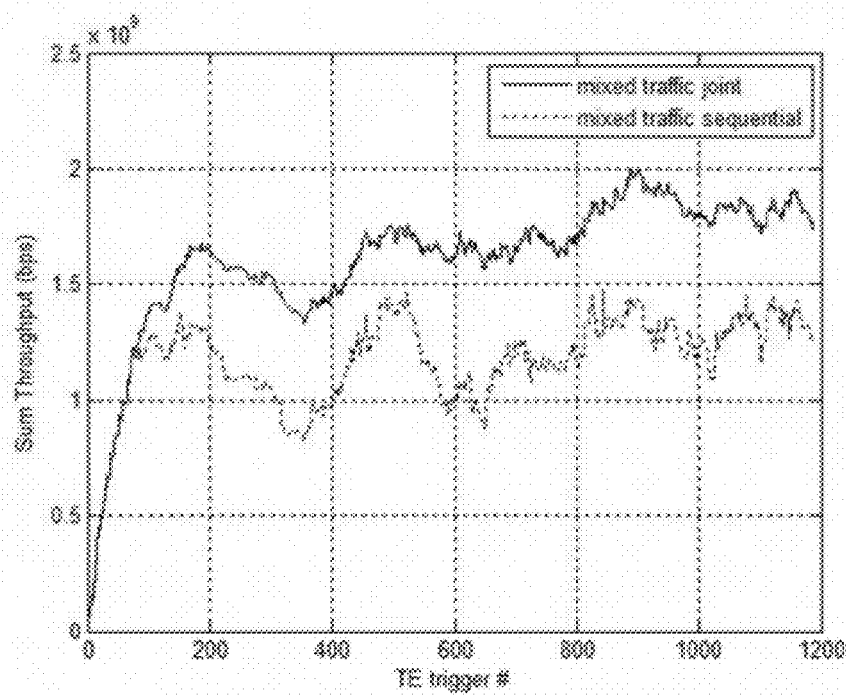
FIGS. 5 and 6 are graphs illustrating the performance of BE flows in terms of sum rate of a simulated traffic engineering scenario having undergone path-based traffic engineering in accordance with the present disclosure.
Figure 6:
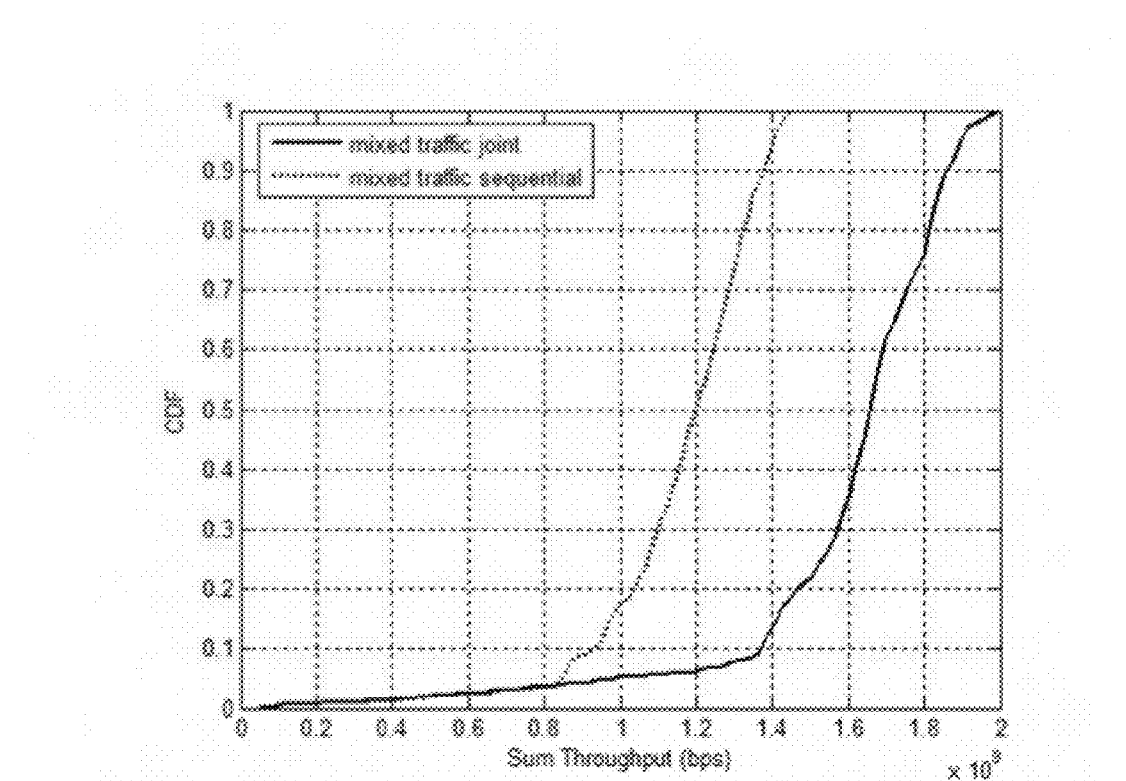

For simulation purposes, an example scenario was used in which the communications network had 57 nodes and 570 users, half of the flows are QoS flows with a constant bit rate (CBR), the other half of the flows are BE flows, and the demand of each QoS flow is a flow rate of at least 2 Mbps. The weightings (scalarization parameters) are set at $10^7$ and 1 for QoS and BE flows, respectively. It will be appreciated that the scalarization parameters used in the simulation, though representing weightings allocated to the QoS or BE performance objectives, are not necessarily fractional or percentage values. The choice of weightings typically depends on the scale of the QoS and BE objective functions. FIG. 4 is a graph illustrating the performance of the QoS flows in the simulated traffic engineering scenario in terms of a mean session QoE. As shown in FIG. 4, the performance of the QoS flows is the same in terms of flow demand satisfaction whether a conventional traffic engineering solution in which BE traffic is handled with network resources remaining after QoS traffic has been allocated is used or a path-based jointly optimized traffic engineering solution in accordance with the present disclosure is used. However, as shown in FIGS. 5 and 6, the jointly optimized traffic engineering solution shows significant improvement in terms of maximizing the total rate of the BE flows, as shown by the difference in the BE traffic sum throughput (in bps) between the conventional traffic engineering solution (labelled as mixed traffic sequential in FIGS. 5 and 6) and the jointly optimized traffic engineering solution (labelled as mixed traffic joint in FIGS. 5 and 6). FIG. 5 illustrates the sum throughput (in bps) at various TE trigger values (e.g., number of traffic engineering instances) whereas FIG. 6 illustrates the cumulative distribution function (CDF) at various sum throughput (in bps).

In view of the foregoing, it will be appreciated that the potential advantages of a jointly optimized traffic engineering solution in accordance with the present disclosure include providing higher rates (e.g., higher sum throughput) for BE flows while keeping QoS flows satisfied and providing controlled trade-off between QoS and BE flow metrics.

Arc-Based Traffic Engineering

Figure 3:
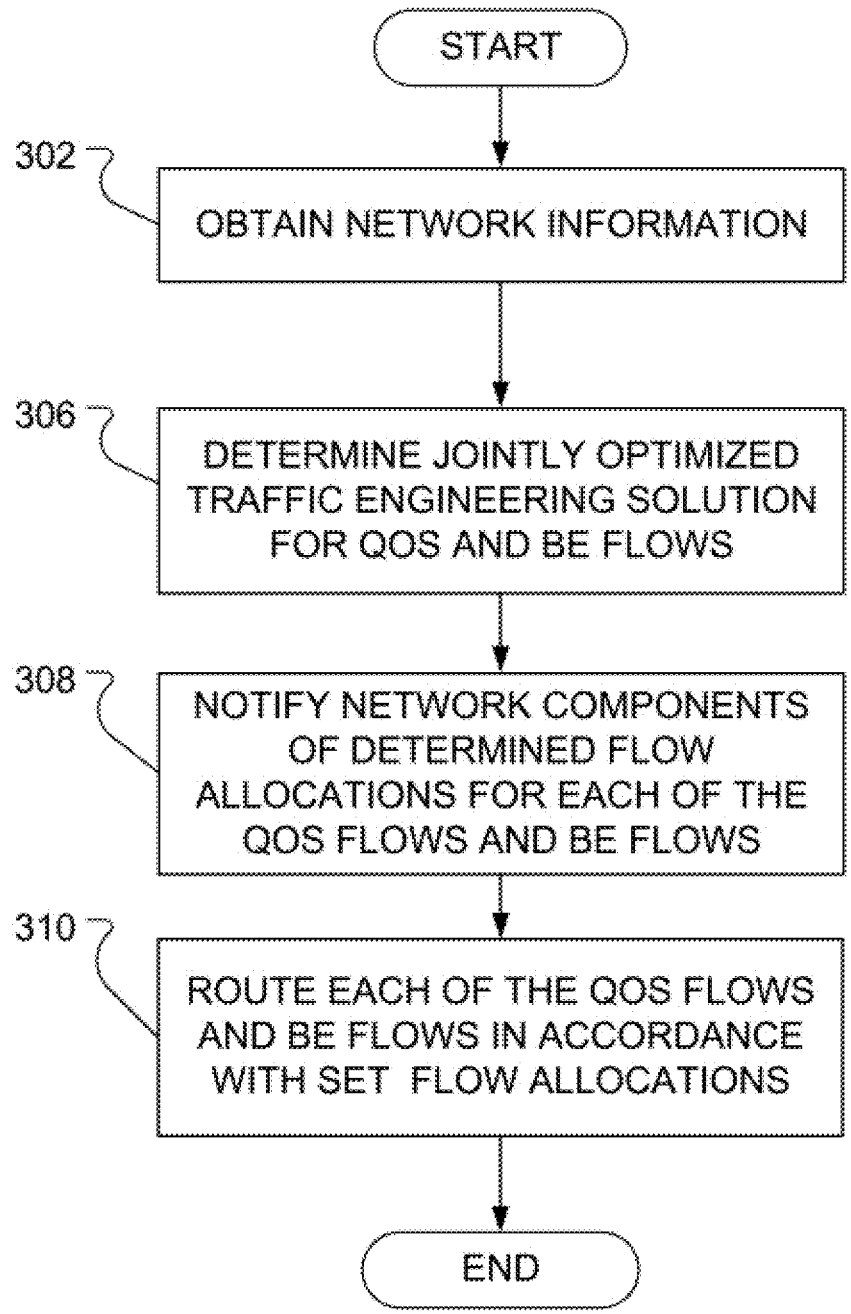
FIG. 3 is a flowchart of a method of arc-based traffic engineering in a communications network having QoS flows and BE flows in accordance with one embodiment of the present disclosure.

Referring now to FIG. 3, a method of arc-based traffic engineering in a communications network, such as the communications network 102, having QoS flows and BE flows in accordance with one embodiment of the present disclosure will be described. The method may be performed by the traffic manager 116 of the TE server 110 described above. The method is illustrated as a collection of logical blocks which represent operations which can be implemented in hardware, software, or a combination thereof. In the context of software, the blocks represent computer-executable instructions that, when executed by the processors 112 of the TE server, cause the processors 112 to perform the recited operations. The coding of software for carrying out such a method is within the scope of a person of ordinary skill in the art provided the present disclosure. The method may contain additional or fewer processes than shown and/or described, and may be performed in a different order.

In methods of arc-based traffic engineering in accordance with the present disclosure, the communications network 102 is modelled as a directed graph G (N, A) in which N denotes a set of nodes 140 in the communications network 102 and A denotes a set of arcs 142 (links). The total number of flows present in the communications network 102 is denoted K, the term $K_1$ denotes the number of QoS flows with demands $d_1, \ldots, d_{K_1}$, and the term $K_2$ is the number of BE flows so that $K=K_1+K_2$, S(k) denotes the source node corresponding to flow k, D(k) denotes the destination node corresponding to flow k, $A_{in}$ (n) denotes the set of arcs going into node n, $A_{out}$(n) denotes the set of arcs going out of node n. In arc-based traffic engineering, no explicit path selection is performed. In the mathematic problem formulation for the arc-based approach, the variables are the allocation of each flow on every link. When the problem is solved and the allocation of every flow on each link is obtained, the paths for each flow are implicitly given by the solution. The method of FIG. 3 may be performed automatically in response to occurrence of a TE trigger event.

At 302, network information such as link information, link capacity information, node information, and flow information regarding the QoS flows and BE flows is obtained by the traffic manager 116, for example, using the path analyzer 118, route analyzer 120 and/or traffic measurer 122. The link information may include the amount of traffic on each link, information about the traffic and connection/disconnection information of the respective link as well as physical information such as link connection information. The flow information includes the total number of flows (denoted K) in the communications network 102, the number of QoS flows present in the communications network 102 (denoted $K_1$) and the number of BE flows present in the communications network 102 (denoted $K_2$).

At 306, the optimizer 124 uses the measured traffic values from the traffic measurer 122 and/or available link capacities derived from measured traffic values, flow conservation constraints of the QoS flows and the BE flows, constraints of the communications network 102, QoS performance objectives for the QoS flows, and BE performance objectives for the BE flows, and a weighting allocated to the QoS performance objectives and BE performance objectives denoted $w^{QoS}$ and $w^{BE}$, respectively, to analyze potential flow allocations on links corresponding to each of the QoS flows and BE flows, and to determine a traffic engineering solution jointly optimized for both the QoS flows and the BE flows. It will be appreciated that both the QoS flows and BE flows are typically multipath in that a portion of each flow will be allocated to links in a manner which defines multiple paths through the communications network 102.

The weightings $w^{QoS}$ and $w^{BE}$ represent the preference given to the QoS flows relative to the BE flows as described above in connection with the method of FIG. 2. Depending on network resources and the weightings allocated to QoS performance objectives and BE performance objectives, the traffic engineering solution may result in QoS demands being unsatisfied. For example, if the weighting $w^{BE}$ allocated to the BE performance objectives is non-zero and network resources are not sufficient, QoS demands of at least some of the QoS flows may not be satisfied so that network resources are allocated more in favour of BE flows.

The QoS performance objectives for the QoS flows and the BE performance objectives for the BE flows are network configuration parameters set, for example, by a network operator to optimize the use of network resources. The QoS performance objectives and BE performances are generally similar to those described above in connection with the method of FIG. 2.

With respect to 306, determining a jointly optimized traffic engineering solution comprises determining jointly optimized flow allocations (also known as flow rates) on links corresponding to each of the QoS flows and BE flows in accordance with flow conservation constraints of the QoS flows and the BE flows, constraints of the communications network 102, one or more BE performance objectives, one or more QoS performance objectives, and a weighting allocated to each of the BE performance objective and QoS performance objective. It will be appreciated that determining jointly optimized paths involves considering each of the QoS flows and BE flows when determining the jointly optimized traffic engineering solution; however, it is possible that some BE flows and/or some QoS flows do not receive a flow allocation in the jointly optimized traffic engineering solution. That is, some flows could receive a flow allocation of zero.

QoS demands are considered in the flow conservation demands of the QoS flows described below in connection with equations (7.1), (7.2) and (7.3) described below. The flow conservation constraints of the QoS flows and the BE flows and the constraints of the communications network 102 are satisfied by the joint optimized traffic engineering solution. The determining 306 comprises calculating flow allocations on the links corresponding to each of the QoS flows and BE flows.

The flow conservation constraints apply to both QoS flows and BE flows. In some embodiments, the flow conservation constraints for the QoS flows are given by equations (7.1) and (7.2) and the flow conservation constraints for the BE flows are given by equation (8) which are defined as:

$$\sum_{a \in A_{in}(n)} y_a^k - \sum_{a \in A_{out}(n)} y_a^k = \begin{cases} 0 & \forall n \neq S(k), n \neq D(k) \\ -r_k & n = S(k) \\ r_k & n = D(k) \end{cases} \quad (7.1)$$

$$k = 1, \ldots, K_1,$$

$$r_k \leq d_k, \quad k = 1, \ldots, K_1, \quad (7.2)$$

$$\sum_{a \in A_{in}(n)} y_a^k - \sum_{a \in A_{out}(n)} y_a^k = \begin{cases} 0 & \forall n \neq S(k), n \neq D(k) \\ -r_k & n = S(k) \\ r_k & n = D(k) \end{cases} \quad (8)$$

$$k = K_1 + 1, \ldots, K_1 + K_2.$$

Equations (7.1), (7.2) and (8) represent flow conservation constraints for each node in the communications network 102 that the total amount of traffic of any given flow going into a node equals the amount of traffic corresponding to that flow going out of that node except for flow source and destination nodes, where $K_1$ denotes the number of QoS flows, $K_2$ denotes the number of BE flows, and K denotes the total number of flows present in the communications network 102 ($K=K_1+K_2$). In equations (7.1), (7.2), (7.3) and (8), the term $y_a^k$ denotes the flow allocation (in bps) of flow k on arc a, $r_k$ denotes the rate allocated to flow k, $k=1, \ldots, K_1+K_2$, $d_k$ denotes the demands of flow k, S(k) denotes the source node corresponding to flow k, D(k) denotes the destination node corresponding to flow k, $A_{in}(n)$ denotes the set of arcs going into node n, and $A_{out}(n)$ denotes the set of arcs going out of node n. The inequality sign in equation (7.2) ensures that the joint traffic engineering problem is always feasible regardless of the QoS flow demands and the available network resources.

In other embodiments, the flow conservation constraints for the QoS flows are given by equations (7.1) and (7.3) which are defined as:

$$\sum_{a \in A_{in}(n)} y_a^k - \sum_{a \in A_{out}(n)} y_a^k = \begin{cases} 0 & \forall n \neq S(k), n \neq D(k) \\ -r_k & n = S(k) \\ r_k & n = D(k) \end{cases} \quad (7.1)$$

$$k = 1, \ldots, K_1,$$

$$r_k = \lambda d_k, \quad k = 1, \ldots, K_1, \quad (7.3)$$

Equations (7.1) and (7.3) represent flow conservation constraints for QoS flows for each node in the communications network 102 that the total amount of traffic of any given flow going into a node equals the amount of traffic corresponding to that flow going out of that node except for the flow source and destination nodes, where $K_1$ denotes the number of QoS flows, $K_2$ denotes the number of BE flows, and K denotes the total number of flows present in the communications network 102 ($K=K_1+K_2$). In equation (7.3), the rate allocated to flow k, $r_k$ is $r_k=\lambda d_k$, wherein the term $\lambda$ denotes an auxiliary variable for weighted max-min formulation. As noted above, a value of $\lambda>1$ represents an overprovisioning condition with respect to the QoS flows. A value of $\lambda>1$ means that the sum of the flow allocations over the various paths for the QoS flows exceeds the QoS demands. A value of $\lambda<1$ typically represents an underprovisioning condition with respect to the QoS flows in which none of the QoS flow demands are satisfied. It is also contemplated that some QoS flows are overprovisioned whereas other QoS flows are not, or that the amount of overprovisioning may vary (i.e. having more or less overprovisioning) between different QoS flows which are overprovisioned. In this way, differential overprovisioning may be provided. One approach to implementing such differential overprovisioning is to use artificially larger demand $d_k$ for flows which are overprovisioned compared with QoS flows which are not overprovisioned or which are overprovisioned to a less degree, and use the same $\lambda$, which would result in the particular flow(s) having a higher larger demand $d_k$ being overprovisioned relative to its actual demand.

The constraints of the communications network 102 include backhaul link constraints which are applicable to all QoS flows and all BE flows in so far as backhaul links are utilized. This is a technical constraint of the communications network 102. The backhaul link constraints are given by equation (9) defined as:

$$\sum_k y_a^k \leq c_a, \forall \text{ wired link } a. \quad (9)$$

Equation (9) represents a backhaul link constraint that the total traffic going through any backhaul link does not exceed the link capacity. In equation (9), the term $c_a$ is the link capacity of the backhaul wired link a. The links of the backhaul part of a RAN are modeled as fixed-capacity links (e.g., wired links) in accordance with equation (9) whereas wireless links are modeled differently as described by equation (10) described below.

The constraints of the communications network 102 also include wireless access node constraints which are applicable to all QoS flows and all BE flows in so far as wireless access nodes links are utilized. This is a technical constraint of the communications network 102. The wireless access node constraints are given by equation (10) defined as:

$$\sum_k \sum_{a \in A_{out}(n)} \frac{y_a^k}{s_a} \leq r_n, \forall \text{ wireless access node } n. \quad (10)$$

Equation (10) represents a wireless access node constraint that the sum of the bandwidth used at any wireless access node does not exceed the total bandwidth of the node. In equation (10), the term a is a last wireless (hop) link, $s_a$ is the spectral efficiency of the last wireless link a, and $r_n$ is the total bandwidth available at wireless access node n.

Because the QoS performance objectives and the BE performance objectives are conflicting objectives, a jointly optimized solution involves trade-offs between the QoS performance objectives and the BE performance objectives, thereby creating a multi-objective optimization (MOO) problem. The QoS performance objectives and BE performance objectives may be represented mathematically by objective functions. Thus, the MOO problem can be defined by the two objective functions defined by the QoS performance objectives of the QoS flows and the BE performance objectives of the BE flows. Using the well-known linear scalarization technique, the MOO problem can be used to obtain the following single-objective optimization problem:

$$\max_{y_1, \ldots, y^{K_1+K_2}} w^{QoS} U^{QoS}(y^1, \ldots, y^{K_1}) + \quad (11)$$

$$w^{BE} U^{BE}(y^{K_1+1}, \ldots, y^{K_1+K_2})$$

subject to equations (7.1), (8), (9), and (10).

Equation (11) represents a solution to the joint optimization problem and is subject to equations (7.1), (8), (9) and (10). It will be appreciated that the MOO problem can be formulated as a maximization problem or minimization problem, and that the MOO can be changed from a maximization problem to a minimization problem and vice versa with an appropriate change in sign. In equation (11), $U^{QoS}(y^1, \ldots, y^{K_1})$ is an objective function which represents the QoS performance objectives to be optimized for the QoS flows, $U^{BE}(y^{K_1+1}, \ldots, y^{K_1+K_2})$ is an objective function which represents the BE performance objectives to be optimized for the BE flows, $w^{QoS}$ weighting allocated to the QoS performance objectives of the QoS flows in the form of a scalarization parameter, $w^{BE}$ is a weighting allocated to the BE performance objectives of the BE flows in the form of a scalarization parameter. As described above, the QoS performance objectives and BE performance objectives are determined by the network operator and may vary widely between different implementations. It will be appreciated that the scalarization parameters in equation (11), though representing weightings allocated to the QoS or BE performance objectives, are not necessarily fractional or percentage values, depending on the formulation of the particular single-objective optimization problem given the QoS and BE performance objectives. The weightings $w^{QoS}$ and $w^{BE}$ define the trade-offs between QoS and BE performance objectives. The larger the weighting, the higher importance the corresponding performance objective has in the single-objective optimization problem of equation (11). The weightings are set by, for example, a network operator based on a selected trade-offs between QoS and BE performance objectives and are provided as input to the TE server 110. The TE server 110 jointly performs traffic engineering for all flows by solving the optimization problem of equation (11) to provide a traffic engineering solution that may more closely approximate a Pareto optimal traffic engineering solution for both the QoS flows and the BE flows. It will be appreciated that a solution is Pareto optimal when none of the objective functions can be improved in value without impairment of at least some of the other objective functions.

At 308, the traffic manager 116 notifies one or more relevant network components, such as routers, in the communications network 102 of the jointly optimized flow allocations for each of the QoS flows and BE flows. The notifying of the one or more relevant network components may be performed by the TE server 110 or other network component, such as intermediate node. The settings of the relevant routers are then set or modified in accordance with the jointly optimized flow allocations after receiving the notification so that routing of data communications will occur in accordance with the jointly optimized flow allocations. The jointly optimized flow allocations of the QoS flows and BE flows which are relevant to a particular router may be stored in the memory of the particular router. In some embodiments, the one or more relevant network components may self-set or self-update by setting or modifying routing settings in response to receiving the jointly optimized flow allocations. In other embodiments, the TE server 110 or other network component may send instructions to at least one network component in the communications network 102, the instructions including the jointly optimized flow allocations for each of the QoS flows and BE flows and instructions which cause the at least one network component to set or modify routing settings in accordance with the jointly optimized flow allocations. The routing tables used by the various routers in the communications network 102 may be set or modified by the TE server 110 or other network component, depending on the embodiment. In at least some examples, the jointly optimized traffic engineering solution uses multiple paths for some QoS flows and/or BE flows.

At 310, each of the QoS flows and BE flows are routed through the communications network 102 in accordance with the jointly optimized flow allocations from in 308.

While the above described methods describe a number of traffic engineering constraints, it will be appreciated that in addition to flow demand constraints, wired link capacity constraints, and wireless access node constraints, a traffic engineering problem may have other constraints, such as constraints on packet delays, etc. The present disclosure is intended to capture embodiments having other such additional constraints.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other non-volatile or non-transitory similar machine readable medium having tangibly stored thereon executable instructions for performing the methods described herein. The machine readable medium may be, for example, a compact disc (CD), digital versatile disc (DVD), Blu-ray disc, flash drive, or a hard drive.

While example embodiments and various advantages have been described in detail in the foregoing description, it should be understood that the teachings of the present disclosure may be embodied in other specific forms and that various changes, substitutions and alterations can be made herein without departing from the scope of the present disclosure. The described example embodiments are to be considered in all respects as being only illustrative and not restrictive. The scope of the present disclosure is, therefore, described by the appended claims rather than by the foregoing description.

The invention claimed is:

1. A method of traffic engineering in a communications network having a plurality of Quality of Service (QoS) flows each having one or more QoS demands and a plurality of Best Effort (BE) flows each without any QoS demands, the method comprising:
  determining jointly optimized paths and respective flow allocations for at least a subset of the QoS flows and BE flows by jointly optimizing a first network configuration parameter relating to the allocation of the BE flows and a second network configuration parameter relating to the allocation of the QoS flows taking into account constraints of the communications network and a relative weighting allocated to the first network configuration parameter and the second network configuration parameter; and
  notifying at least one network component in the communications network of the jointly optimized paths and respective flow allocations for each of the QoS flows and BE flows.

2. The method of claim 1, further comprising:
  routing at least some of the QoS flows and at least some of the BE flows through the communications network in accordance with the jointly optimized paths and respective flow allocations.

3. The method of claim 1, wherein the jointly optimized paths and the respective flow allocations for each of the QoS flows and BE flows are jointly optimized in accordance with demands of the QoS flows so that a sum of flow allocation over paths for a QoS flow does not exceed the flow demand.

4. The method of claim 1, wherein the jointly optimized paths and the respective flow allocations for each of the QoS flows and BE flows are jointly optimized so that total traffic going through any backhaul link does not exceed a link capacity of the respective backhaul link.

5. The method of claim 1, wherein the jointly optimized paths and the respective flow allocations for each of the QoS flows and BE flows are jointly optimized so that a sum of bandwidth used at any wireless access node does not exceed a total bandwidth of the respective wireless access node.

6. The method of claim 1, wherein the jointly optimized paths and the respective flow allocations for each of the QoS flows and BE flows are jointly optimized in accordance with demands of the QoS flows so that flow allocation (in bps) of path j of flow k, denoted by $x_j^k$, satisfies the following constraint $$\sum_{j=1}^{l_k} x_j^k \le d_k, k = 1, \ldots, K_1.$$

wherein $K_1$ denotes the number of QoS flows, $d_1, \ldots, d_{K_1}$ denote the demands of the QoS flows, $l_k$ denotes the number of candidate paths for flow k, wherein the jointly optimized paths and the respective flow allocations for each of the QoS flows and BE flows are jointly optimized so that a link capacity of any backhaul wired link a, denoted $c_a$, satisfies the following constraint $$\sum_{\text{path } p_j^k \text{ passing link } a} x_j^k \le c_a, \forall \text{ wired link } a,$$

wherein $p_j^i$ denotes the path j of flow i, i=1, ..., $K_1+K_2$, j=1, ..., $l_i$, wherein $K_2$ denotes the number of BE flows;

wherein the jointly optimized paths and the respective flow allocations for each of the QoS flows and BE flows are jointly optimized so that a total bandwidth available at wireless access node n, denoted $r_n$, satisfies the following constraint $$\sum_{\text{path } p_j^k \text{ passing node } n} \frac{x_j^k}{s_{a(k,j)}} \le r_n, \forall \text{ wireless node } n,$$

wherein a(i,j) is a last wireless (hop) link of path $p_j^i$, i=1, ..., $K_1+K_2$, j=1, ..., $l_i$, and $s_{a(i,j)}$ is the spectral efficiency of the last wireless link a(i,j).

7. The method of claim 1, wherein the jointly optimized paths and the respective flow allocations for each of the QoS flows and BE flows are jointly optimized in accordance with demands of the QoS flows so that flow allocation (in bps) of path j of flow k, denoted by $x_j^k$, satisfies the following constraint $$\Sigma_{j=1}^{l_k} x_j^k = \lambda d_k, k=1, \ldots, K_1,$$

wherein $K_1$ denotes the number of QoS flows, $d_1, \ldots, d_{K_1}$ denote the demands of the QoS flows, $l_k$ denotes the number of candidate paths for flow k, wherein the jointly optimized paths and the respective flow allocations for each of the QoS flows and BE flows are jointly optimized so that a link capacity of any backhaul wired link a, denoted $c_a$, satisfies the following constraint $$\sum_{\text{path } p_j^k \text{ passing link } a} x_j^k \leq c_a, \forall \text{ wired link } a,$$

wherein $p_j^i$ denotes the path j of flow i, . . . , i=1, . . . , $K_1+K_2$, i=1, . . . , $l_i$, wherein $K_2$ denotes the number of BE flows;

wherein the jointly optimized paths and the respective flow allocations for each of the QoS flows and BE flows are jointly optimized so that a total bandwidth available at wireless access node n, denoted $r_n$, satisfies the following constraint $$\sum_{\text{path } p_j^k \text{ passing node } n} \frac{x_j^k}{s_{a(k,j)}} \leq r_n, \forall \text{ wireless node } n,$$

wherein $\alpha(i,j)$ is a last wireless (hop) link of path $p_j^i$, i=1, . . . , $K_1+K_2$, j=1, . . . $l_i$, and $s_{a(i,j)}$ is the spectral efficiency of the last wireless link $a(i,j)$.

8. The method of claim 1, wherein the jointly optimized paths and the respective flow allocations for each of the QoS flows and BE flows are jointly optimized according to the following optimization problem $$\max_{x^1,\ldots,x^{K_1+K_2}} w^{QoS} U^{QoS}(x^1, \ldots, x^{K_1}) + w^{BE} U^{BE}(x^{K_1+1}, \ldots, x^{K_1+K_2})$$

wherein $U^{QoS}(x^1, \ldots, x^{K_1})$ is an objective function representing the second network configuration parameter relating to the allocation of the QoS flows, $U^{BE}(x^{K_1+1}, \ldots, x^{K_1+K_2})$ is an objective function representing the first network configuration parameter relating to the allocation of the BE flows, $w^{QoS}$ is a relative weighting allocated to the second network configuration parameter, and $w^{BE}$ is a relative weighting allocated to the first network configuration parameter.

9. The method of claim 1, further comprising:
before determining jointly optimized paths and respective flow allocations for each of the QoS flows and BE flows, determining candidate paths between a respective source and a respective destination for each of the QoS flows and BE flows;
wherein the jointly optimized paths and respective flow allocations for each of the QoS flows and BE flows are determined from the candidate paths between the respective source and the respective destination.

10. The method of claim 9, wherein the candidate paths are a subset of all paths between the respective source and the respective destination.

11. The method of claim 1, wherein the first network configuration parameter is a weighted sum flow rate, weighted max-min flow rate or a load balancing factor.

12. The method of claim 1, wherein the second network configuration parameter includes an overprovisioning factor for the QoS flows when available network resources are more than sufficient to satisfy the demands of the QoS flows.

13. The method of claim 1, wherein the second network configuration parameter includes a cost factor when available network resources are not sufficient to satisfy the demands of the QoS flows.

14. A method of traffic engineering in a communications network having a plurality of Quality of Service (QoS) flows each having one or more QoS demands and a plurality of Best Effort (BE) flows each without any QoS demands, the method comprising:
determining jointly optimized flow allocations on links for at least a subset of the QoS flows and BE flows by jointly optimizing a first network configuration parameter relating to the allocation of the BE flows and a second network configuration parameter relating to the allocation of the QoS flows taking into account flow conservation constraints of the QoS flows and the BE flows, constraints of the communications network and a relative weighting allocated to the first network configuration parameter and the second network configuration parameter; and
notifying at least one network component in the communications network of the determined flow allocations for each of the QoS flows and BE flows.

15. The method of claim 14, further comprising:
routing at least some of the QoS flows and at least some of the BE flows through the communications network in accordance with the jointly optimized flow allocations.

16. The method of claim 14, wherein the jointly optimized flow allocations on links are jointly optimized so that a total amount of traffic of any given flow going into a node equals exceed an amount of traffic corresponding to that flow going out of the node except for the flow source and destination nodes, so that total traffic going through any backhaul link does not exceed a link capacity of the respective backhaul link, and so that a sum of bandwidth used at any wireless access node does not exceed a total bandwidth of the respective wireless access node.

17. The method of claim 14, wherein the jointly optimized flow allocations on links are jointly optimized so that the allocation of flow k on arc a, denoted $y_a^k$, satisfies flow conservation constraints for the QoS flows given by $$\sum_{a \in A_{in}(n)} y_a^k - \sum_{a \in A_{out}(n)} y_a^k = \begin{cases} 0 & \forall n \neq S(k), n \neq D(k) \\ -r_k & n = S(k) \\ r_k & n = D(k) \end{cases}$$

$$k = 1, \ldots, K_1,$$

$$r_k \leq d_k, k = 1, \ldots, K_1,$$

and satisfies flow conservation constraints for the BE flows given by $$\sum_{a \in A_{in}(n)} y_a^k - \sum_{a \in A_{out}(n)} y_a^k = \begin{cases} 0 & \forall n \neq S(k), n \neq D(k) \\ -r_k & n = S(k) \\ r_k & n = D(k) \end{cases},$$

$$k = K_1 + 1, \ldots, K_1 + K_2.$$

wherein $K_1$ denotes the number of QoS flows, $d_1, \ldots, d_{K_1}$ denotes the demands of the QoS flows, $r_k$ denotes the rate allocated to flow k, k=1, . . . , $K_1+K_2$, $K_2$ denotes the number of BE flows, S(k) denotes the source node corresponding to flow k, D(k) denotes the destination node corresponding to flow k, $A_{in}(n)$ denotes the set of arcs going into node n, $A_{out}(n)$ denotes the set of arcs going out of node n, wherein the jointly optimized flow allocations on links are jointly optimized so that a link capacity of any backhaul wired link a, denoted $c_a$, satisfies the following constraint $$\sum_k y_a^k \leq c_a, \forall \text{ wired link } a.$$

wherein the jointly optimized flow allocations on links are jointly optimized so that a total bandwidth available at wireless access node n, denoted $r_n$, satisfies the following constraint $$\sum_k \sum_{a \in A_{out}(n)} \frac{y_a^k}{s_a} \leq r_n, \forall \text{ wireless access node } n.$$

wherein a is a last wireless (hop) link and $s_a$ is the spectral efficiency of the last wireless link a.

18. The method of claim 14, wherein the jointly optimized flow allocations on links are jointly optimized so that the allocation of flow k on arc a, denoted $y_a^k$, satisfies flow conservation constraints for the QoS flows given by $$\sum_{a \in A_{in}(n)} y_a^k - \sum_{a \in A_{out}(n)} y_a^k = \begin{cases} 0 & \forall n \neq S(k), n \neq D(k) \\ -r_k & n = S(k) \\ r_k & n = D(k) \end{cases}$$

$$k = 1, \ldots, K_1,$$

$$r_k = \lambda d_k, k = 1, \ldots, K_1,$$

and satisfies flow conservation constraints for the BE flows given by $$\sum_{a \in A_{in}(n)} y_a^k - \sum_{a \in A_{out}(n)} y_a^k = \begin{cases} 0 & \forall n \neq S(k), n \neq D(k) \\ -r_k & n = S(k) \\ r_k & n = D(k) \end{cases},$$

$$k = K_1 + 1, \ldots, K_1 + K_2.$$

wherein $K_1$ denotes the number of QoS flows, $d_1, \ldots, d_{K_1}$ denotes the demands of the QoS flows, $\lambda$ denotes a weighted max-min, $r_k$ denotes the rate allocated to flow k, k=1, ..., $K_1 + K_2$, $K_2$ denotes the number of BE flows, S(k) denotes the source node corresponding to flow k, D(k) denotes the destination node corresponding to flow k, $A_{in}(n)$ denotes the set of arcs going into node n, $A_{out}(n)$ denotes the set of arcs going out of node n, wherein the jointly optimized flow allocations on links are jointly optimized so that a link capacity of any backhaul wired link a, denoted $c_a$, satisfies the following constraint $$\sum_k y_a^k \leq c_a, \forall \text{ wired link } a.$$

wherein the jointly optimized flow allocations on links are jointly optimized so that a total bandwidth available at wireless access node n, denoted $r_n$, satisfies the following constraint $$\sum_k \sum_{a \in A_{out}(n)} \frac{y_a^k}{s_a} \leq r_n, \forall \text{ wireless access node } n.$$

wherein a is a last wireless (hop) link and $s_a$ is the spectral efficiency of the last wireless link a.

19. The method of claim 14, wherein the jointly optimized flow allocations on links are jointly optimized according to the following optimization problem $$\max_{y^1, \ldots, y^{K_2}} w^{QoS} U^{QoS}(y^1, \ldots, y^{K_1}) + w^{BE} U^{BE}(y^{K_1+1}, \ldots, y^{K_1+K_2})$$

wherein $U^{QoS}(y^1, \ldots, y^{K_1})$ is an objective function representing the second network configuration parameter relating to the allocation of the QoS flows, $U^{BE}(y^{K_1+1}, \ldots, y^{K_1+K_2})$ is an objective function representing the first network configuration parameter relating to the allocation of the BE flows, $w^{QoS}$ is a relative weighting allocated to the second network configuration parameter, and $w^{BE}$ is a relative weighting allocated to the first network configuration parameter.

20. A traffic engineering (TE) server for allocating traffic in a communications network having Quality of Service (QoS) flows each having one or more QoS demands and a plurality of Best Effort (BE) flows each without any QoS demands, the TE server comprising:
a communication interface for communicating with the communications network;
a processor coupled to the communication interface and configured for:
determining jointly optimized paths and respective flow allocations for at least a subset of the QoS flows and BE flows by jointly optimizing network configuration parameter relating to the allocation of the BE flows and a second network configuration parameter relating to the allocation of the QoS flows taking into account constraints of the communications network and a relative weighting allocated to the first network configuration parameter and the second network configuration parameter; and
notifying at least one network component in the communications network of the jointly optimized paths and respective flow allocations for each of the QoS flows and BE flows.

21. A non-transitory machine readable medium having tangibly stored thereon executable instructions that, when executed by a processor of a traffic engineering server, cause the traffic engineering server to perform a method of traffic engineering (TE) server for allocating traffic in a communications network having Quality of Service (QoS) flows each having one or more QoS demands and a plurality of Best Effort (BE) flows each without any QoS demands, the processor being configured for:

determining jointly optimized paths and respective flow allocations for at least a subset of the QoS flows and BE flows by jointly optimizing a first network configuration parameter relating to the allocation of the BE flows and a second network configuration parameter relating to the allocation of the QoS flows taking into account constraints of the communications network and a relative weighting allocated to the first network configuration parameter and the second network configuration parameter; and notifying at least one network component in the communications network of the jointly optimized paths and respective flow allocations for each of the QoS flows and BE flows.

22. A traffic engineering (TE) server for allocating traffic in a communications network having Quality of Service (QoS) flows each having one or more QoS demands and a plurality of Best Effort (BE) flows each without any QoS demands, the TE server comprising:

a communication interface for communicating with the communications network;

a processor coupled to the communication interface and configured for:

determining jointly optimized flow allocations on links for at least a subset of the QoS flows and BE flows by jointly optimizing a first network configuration parameter relating to the allocation of the BE flows and a second network configuration parameter relating to the allocation of the QoS flows taking into account flow conservation, constraints of the communications network and a relative weighting allocated to the first network configuration parameter and the second network configuration parameter; and notifying at least one network component in the communications network of the determined flow allocations for each of the QoS flows and BE flows.

23. A non-transitory machine readable medium having tangibly stored thereon executable instructions that, when executed by a processor of a traffic engineering server, cause the traffic engineering server to perform a method of traffic engineering (TE) server for allocating traffic in a communications network having Quality of Service (QoS) flows each having one or more QoS demands and a plurality of Best Effort (BE) flows each without any QoS demands, the processor being configured for:

determining jointly optimized flow allocations on links for at least a subset of the QoS flows and BE flows by jointly optimizing a first network configuration parameter relating to the allocation of the BE flows and a second network configuration parameter relating to the allocation of the QoS flows, constraints of the communications network and a relative weighting allocated to the first network configuration parameter and the second network configuration parameter; and notifying at least one network component in the communications network of the determined flow allocations for each of the QoS flows and BE flows.

* * * * *